United States Patent Office 3,365,447
Patented Jan. 23, 1968

3,365,447
2,5-DIHYDRO-4-HYDROXY-2-OXOTHIOPHENS
Derrick Michael O'Mant, Macclesfield, England, assignor to Imperial Chemical Industries Limited, London, England, a corporation of Great Britain
No Drawing. Filed June 25, 1964, Ser. No. 378,066
Claims priority, application Great Britain, July 12, 1963, 27,696/63
3 Claims. (Cl. 260—240)

ABSTRACT OF THE DISCLOSURE

Thiophen derivatives which in one of their tautomeric forms are of the formula:

$$\text{HO}-\!=\!-\text{CO.R}^2$$
$$\text{R}^1.\text{CH}=\!\underset{S}{\diagdown}\!=\!\text{O}$$

wherein $R^1$ is aryl, optionally substituted and $R^2$ is alkyl or phenyl. Pharmaceutical compositions containing these derivatives and methods of preparing same are also disclosed.

---

This invention relates to heterocyclic compounds and more particularly it relates to thiophen derivatives which possess useful therapeutic properties.

According to the invention we provide thiophen derivatives which in one of their tautomeric forms are of the formula:

$$\text{HO}-\!=\!-\text{CO.R}^2$$
$$\text{R}^1.\text{CH}=\!\underset{S}{\diagdown}\!=\!\text{O}$$

wherein $R^1$ is aryl, optionally substituted and $R^2$ is alkyl tuted, and $R^2$ stands for an alkyl or a phenyl radical.

As suitable values for $R^1$ there may be mentioned, for example, a phenyl radical, optionally bearing one or more substituents selected from the group consisting of halogen atoms, for example chlorine, bromine or fluorine atoms, hydroxy radicals, nitro radicals, alkyl radicals of not more than 5 carbon atoms, for example methyl radicals, alkoxy radicals, for example alkoxy radicals containing not more than 5 carbon atoms, for example methoxy radicals, mono- or di-alkylamino radicals, for example dimethylamino or diethylamino radicals, and acylamino radicals, for example acetylamino radicals.

Thus, as suitable values for $R^1$ when it stands for a substituted aryl radical there may be mentioned, for example, the 4-nitrophenyl, 2,4-dichlorophenyl, 3,4-dichlorophenyl, 4-chlorophenyl, 4-bromophenyl, 4-fluorophenyl and pentafluorophenyl radicals.

As suitable values for $R^2$ when it stands for an alkyl radical there may be mentioned, for example, alkyl radicals of not more than 6 carbon atoms, for example the methyl, ethyl, propyl or butyl radical.

Preferred compounds of the present invention are, for example, in one of their tautomeric forms 3-acetyl-5-(4-nitrobenzylidene) - 2,5-dihydro-4-hydroxy-2-oxothiophen, 3 - acetyl-5 - (2-4-dichlorobenzylidene)-2,5-dihydro-4-hydroxy - 2 - oxothiophen, 3-acetyl-5-(3-4-dichlorobenzylidene) - 2,5-dihydro-4-hydroxy-2-oxothiophen, 3-acetyl-5-(4-chlorobenzylidene) - 2,5-dihydro-4-hydroxy-2-oxothiophen, 3-acetyl-5-(4-bromobenzylidene)-2,5-dihydro-4-hydroxy-2-oxothiophen, and 3-acetyl-5-(pentafluorobenzylidene)2,5-dihydro-4-hydroxy-2-oxothiophen.

According to a further feature of the invention we provide a process for the manufacture of the thiophen derivatives of the invention which comprises the interaction of a compound of the formula:

$$R^1.\text{CHO}$$

wherein $R^1$ has the meaning stated above, and a compound which in one of its tautomeric forms may be represented by the formula:

$$\text{HO}-\!=\!-\text{CO.R}^2$$
$$\underset{S}{\overset{\text{CH}_2}{\diagdown}}\!=\!\text{O}$$

wherein $R^2$ has the meaning stated above.

The interaction may conveniently be carried out in the presence of a diluent or solvent, for example ethanol, benzene or acetic anhydride, and may be accelerated or completed by the application of heat.

The interaction is preferably carried out in the presence of a catalyst. Suitable catalysts are, for example, an alkali metal, for example sodium, an acid, for example hydrogen chloride, or a base, for example sodium ethoxide or piperidine.

The thiophen derivatives of the invention possess valuable anti-allergic and anti-inflammatory properties, for example they are useful in the treatment of arthritis and related conditions in man.

According to a further feature of the invention, therefore, we provide pharmaceutical compositions comprising one or more of the thiophen derivatives of the invention and a pharmaceutically-acceptable diluent or carrier therefor.

The pharmaceutical compositions may be in the form of compositions suitable for oral administration, for example tablets, pills, capsules, or suspensions, or compositions suitable for parenteral administration, for example injectable suspensions, or compositions suitable for topical application, for example creams, lotions or ointments. The pharmaceutical compositions may contain conventional excipients, and they may be obtained by means of conventional techniques. Particularly useful compositions are tablets, pills, and capsules containing from about 5 mg. to about 500 mg. of the thiophen derivative(s) and suspensions for oral or parenteral use containing from about 5 mg./ml. to about 500 mg./ml. of the thiophen derivative(s).

The pharmaceutical compositions may contain, in addition to the thiophen derivative(s) one or more known anti-inflammatory agents, for example acetylsalicylic acid, phenylbutazone, cortisone or hydrocortisone.

The invention is illustrated but not limited by the following examples in which the parts are by weight:

Example 1

A mixture of 1 part of 3-acetyl-2,5-dihydro-4-hydroxy-2-oxothiophen, 3 parts of 4-dimethylaminobenzaldehyde and 40 parts of ethanol is heated under reflux for 1.5 hours. The reaction mixture is cooled and filtered and the solid residue thus obtained is continuously extracted with acetone in a soxhlet apparatus for 24 hours. The resulting extract is evaporated to dryness and there is thus obtained 3 - acetyl-5-(4-dimethylaminobenzylidene)-2,5-dihydro-4-hydroxy-2-oxothiophen, M.P. 206–208° C.

Example 2

A mixture of 1.5 parts of 3-acetyl-2,5-dihydro-4-hydroxy-2-oxothiophen, 1 part of benzaldehyde, 0.02 part of sodium and 50 parts of benzene is distilled for 1 hour during which time the distillate is continuously returned to the reaction mixture via a mechanical separator which removes any water present in the distillate. The reaction mixture is then evaporated to dryness, the solid residue is triturated with ethanol and the mixture is filtered. There is thus obtained 3-acetyl-5-benzylidene-2,5-dihydro-4-hydroxy-2-oxothiophen, M.P. 151–152° C.

In a similar manner, using appropriate starting materials, there are obtained 3-acetyl-5-(4-methoxybenzylidene) - 2,5 - dihydro-4-hydroxy-2-oxothiophen, M.P. 192–193° C., 3-acetyl-5-(4-methylbenzylidene)-2,5-dihydro-4-hydroxy-2-oxothiophen M.P. 183–185° C., 3-acetyl-5-(4-nitrobenzylidene) - 2,5-dihydro-4-hydroxy-2-oxothiophen, M.P. 182–184° C., 3-acetyl-5-(2-chlorobenzylidene)-2,5-dihydro-4-hydroxy-2-oxothiophen, M.P. 155–157° C., 3-acetyl - 5 - (2,4 - dichlorobenzylidene)-2,5-dihydro-4-hydroxy-2-oxothiophen, M.P. 192–194° C., 3-acetyl-5-(3,4-dichlorobenzylidene) - 2,5 - dihydro-4-hydroxy-2-oxothiophen, M.P. 179–181° C., 3-acetyl-5-(4-chlorobenzylidene) - 2,5 - dihydro-4-hydroxy-2-oxothiophen, M.P. 169–171° C., 3-acetyl-5-(4-bromobenzylidene)-2,5-dihydro-4-hydroxy-2-oxothiophen, M.P. 180–182° C., 3-acetyl-5-(2-bromobenzylidene) - 2,5 - dihydro-4-hydroxy-2-oxothiophen, M.P. 152–154° C., 3 - acetyl - 5 - (4-fluorobenzylidene) - 2,5-dihydro-4-hydroxy-2-oxothiophen, M.P. 181–183° C., 3-acetyl-5-(pentafluorobenzylidene)-2,5-dihydro-4-hydroxy-2-oxothiophen, M.P. 157–159° C., 3-acetyl-5-(3 - chloro - 5 - hydroxybenzylidene) - 2,5 - dihydro-4-hydroxy-2-oxothiophen, 236–240° C., and 3-acetyl-5-(2-chloro - 5 - nitrobenzylidene) - 2,5-dihydro-4-hydroxy-2-oxothiophen, M.P. 148–154° C.

*Example 3*

A mixture of 2 parts of 3-benzoyl-2,5-dihydro-4-hydroxy-2-oxothiophen, 3 parts of 4-dimethylaminobenzaldehyde, 0.01 part of piperidine and 40 parts of ethanol is heated under reflux for 15 minutes, and the reaction mixture is then cooled and filtered. The solid residue is washed with benzene and there is thus obtained 3-benzoyl-5 - (4-dimethylaminobenzylidene)-2,5-dihydro-4-hydroxy-2-oxothiophen, M.P. 192–193° C.

3 - benzoyl-2,5-dihydro-4-hydroxy-2-oxothiophen may be prepared as follows:

A mixture of 34.8 parts of ethyl benzoyl acetate and 280 parts of diethyl ether is stirred and maintained at 0–5° C. while 4.8 parts of sodium hydride are slowly added. The suspension thus obtained is maintained at 0–5° C. while 15.3 parts of S-acetylthioglycollyl chloride are added. The reaction mixture is slowly warmed to 15° C. and is then washed with 100 parts of 2 N-hydrochloric acid. The aqueous washings are discarded and the ethereal layer is extracted three times, each time with 100 parts of 10% (w./v.) aqueous sodium carbonate. 25 parts of 11 N-aqueous sodium hydroxide are added to the combined aqueous extracts and the resulting mixture is kept for 4 days at ambient temperature. The mixture is then acidified to pH 1 with 5 N-hydrochloric acid and filtered. The solid residue is crystallised from ethanol and there is thus obtained 3-benzoyl-2,5-dihydro-4-hydroxy-2-oxothiophen, M.P. 75–77° C.

*Example 4*

A mixture of 2 parts of 3-benzoyl-2,5-dihydro-4-hydroxy-2-oxothiophen, 0.5 part of piperidine, 1.5 parts of benzaldehyde and 15 parts of ethanol is heated under reflux for 30 minutes. The reaction mixture is then cooled and filtered and the solid residue is crystallised from ethanol. There is thus obtained 3-benzoyl-5-benzylidene-2,5-dihydro-4-hydroxy-2-oxothiophen, M.P. 146–149° C.

In a similar manner using appropriate starting materials, there are obtained 3-benzoyl-5-(4-methoxybenzylidene) - 2,5-dihydro-4-hydroxy-2-oxothiophen, M.P. 162–163° C., 3-benzoyl-5-(4-methylbenzylidene)-2,5-dihydro-4-hydroxy-2-oxothiophen, M.P. 189–190° C., 3-benzoyl-5 - (4 - nitrobenzylidene) - 2,5-dihydro-4-hydroxy-2-oxothiophen, M.P. 260–262° C., 3-benzoyl-5-(3-nitrobenzylidene)-2,5-dihydro-4-hydroxy-2-oxothiophen, M.P. 247–248° C., 3-benzoyl-5-(2-chlorobenzylidene)-2,5-dihydro-4-hydroxy-2-oxothiophen, M.P. 168–171° C., 3-benzoyl-5 - (2,4 - dichlorobenzylidene) - 2,5-dihydro-4-hydroxy-2-oxothiophen, M.P. 231–233° C., and 3-n-butyryl-5-(2,4-dichlorobenzylidene) - 2,5 - dihydro-4-hydroxy-2-oxothiophen, M.P. 158–160° C.

The 3 - n-butyryl-2,5-dihydro-4-hydroxy-2-oxothiophen (M.P. 71–72° C.) used as starting material in the above example may be prepared in a similar manner to that described for 3 - benzoyl - 2,5-dihydro-4-hydroxy-2-oxothiophen in Example 3.

*Example 5*

A mixture of 250 parts of 3-acetyl-5-(4-fluorobenzylidene) - 2,5 - dihydro - 4-hydroxy-2-oxothiophen and 200 parts of light magnesium carbonate is granulated with a sufficient quantity of 5% w./v. starch paste and the granules are then dried. More maize starch is then added to make a total of 200 parts of maize starch and the mixture is then lubricated by the addition of 6 parts of magnesium stearate. The mixture is then compressed into tablets and there are obtained tablets which may contain from about 5 mg. to about 100 mg. of active ingredient and which may be used for oral administration for therapeutic purposes.

What I claim is:

1. A thiophen derivative which in one of its tautomeric forms has the formula:

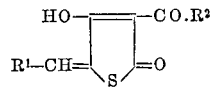

wherein $R^1$ is selected from the group consisting of phenyl and phenyl bearing at least one substituent selected from the group consisting of halogen, nitro, alkoxy of not more than 5 carbon atoms, and monoalkylamino and dialkylamino wherein alkyl is of not more than 6 carbon atoms, and $R^2$ is selected from the group consisting of alkyl of not more than 6 carbon atoms and phenyl.

2. A thiophen derivative, as claimed in claim 1, wherein $R^2$ stands for methyl.

3. A thiophen derivative selected from the group consisting of 3 - acetyl-5-(4-nitrobenzylidene)-2,5-dihydro-4-hydroxy - 2 - oxothiophen, 3-acetyl-5-(2,4-dichlorobenzylidene) - 2,5-dihydro-4-hydroxy-2-oxothiophen, 3-acetyl-5-(3,4 - dichlorobenzylidene)-2,5-dihydro-4-dydroxy-2-oxothiophen, 3-acetyl-5-(4-chlorobenzylidene)-2,5-dihydro-4 - hydroxy - 2 - oxothiophen, 3-acetyl-5-(4-bromobenzylidene) - 2,5-dihydro-4-hydroxy-2-oxothiophen, 3-acetyl-5-(4 - fluorobenzylidene)-2,5-dihydro-4-hydroxy-2-oxothiophen and 3 - acetyl - 5 - (pentafluorobenzylidene)-2,5-dihydro-4-hydroxy-2-oxothiophen.

References Cited

Benary: Ber. Deut. Chem., vol. 43, page 1951 (1910).
Benary: Ber. Deut. Chem., vol. 46, pages 2105–2106 (1913).
Hartough: "Thiophene and Its Derivatives," pages 409–410, Interscience Publishers, Inc., N.Y. (1952).

JOHN D. RANDOLPH, *Primary Examiner.*